United States Patent
Kniess et al.

(10) Patent No.: US 10,066,075 B2
(45) Date of Patent: Sep. 4, 2018

(54) PIGMENTS BASED ON BISMUTH COMPOUNDS

(71) Applicant: MERCK PATENT GMBH, Darmstadt (DE)

(72) Inventors: Helge Bettina Kniess, Rossdorf (DE); Franciscus Gerardus Henricus Van Duijnhoven, Mierlo (NL); Franciscus Wilhelmus Maria Gelissen, Selfkant (DE)

(73) Assignee: MERCK PATENT GMBH, Darmstadt (DE)

( * ) Notice: Subject to any disclaimer, the term of this patent is extended or adjusted under 35 U.S.C. 154(b) by 2 days.

(21) Appl. No.: 15/028,235

(22) PCT Filed: Sep. 16, 2014

(86) PCT No.: PCT/EP2014/002495
§ 371 (c)(1),
(2) Date: Apr. 8, 2016

(87) PCT Pub. No.: WO2015/051868
PCT Pub. Date: Apr. 16, 2015

(65) Prior Publication Data
US 2016/0251492 A1 Sep. 1, 2016

(30) Foreign Application Priority Data
Oct. 11, 2013 (DE) .................. 10 2013 016 932

(51) Int. Cl.
| C09D 11/037 | (2014.01) |
| C09D 11/322 | (2014.01) |
| C08K 3/22 | (2006.01) |
| C08K 3/24 | (2006.01) |
| C08K 3/34 | (2006.01) |
| C08K 3/36 | (2006.01) |
| C09C 1/00 | (2006.01) |
| C01G 29/00 | (2006.01) |
| B41M 5/26 | (2006.01) |
| B41J 2/455 | (2006.01) |
| C08K 3/013 | (2018.01) |

(52) U.S. Cl.
CPC .............. *C08K 3/22* (2013.01); *C01G 29/00* (2013.01); *C01G 29/006* (2013.01); *C08K 3/24* (2013.01); *C08K 3/34* (2013.01); *C08K 3/36* (2013.01); *C09C 1/0081* (2013.01); *B41J 2/455* (2013.01); *B41M 5/267* (2013.01); *C01P 2004/80* (2013.01); *C08K 3/013* (2018.01)

(58) Field of Classification Search
CPC ...... C09D 11/037; C09D 11/322; C08K 3/22; C08K 3/24; C08K 3/34; C08K 3/36; C08K 3/0033; C01G 29/00; C01G 29/006; C01P 2004/61; C01P 2004/62; C01P 2004/80; C09C 1/0081

USPC ................................ 106/31.9, 479
See application file for complete search history.

(56) References Cited

U.S. PATENT DOCUMENTS

| 4,344,987 | A | 8/1982 | Ostertag et al. |
| 4,617,061 | A * | 10/1986 | Kohler ................ C01B 13/18 |
| | | | 106/453 |
| 5,149,369 | A * | 9/1992 | Eberts ................. C01G 29/00 |
| | | | 106/479 |
| 5,336,312 | A * | 8/1994 | Byrne ................. C01G 29/006 |
| | | | 106/436 |
| 6,139,614 | A | 10/2000 | Schmid et al. |
| 6,171,383 | B1 * | 1/2001 | Sakoske ................ C09C 1/00 |
| | | | 106/400 |
| 6,306,493 | B1 | 10/2001 | Brownfield et al. |
| 6,503,316 | B1 | 1/2003 | Sakoske et al. |
| 6,596,070 | B1 | 7/2003 | Schmidt et al. |
| 6,599,355 | B1 | 7/2003 | Schmidt et al. |
| 6,680,121 | B2 | 1/2004 | Sakoske et al. |
| 7,318,862 | B2 | 1/2008 | Carsten et al. |
| 8,530,785 | B2 | 9/2013 | Peng et al. |
| 8,790,769 | B2 * | 7/2014 | Prissok .................. B41M 5/267 |
| | | | 428/156 |
| 9,150,702 | B2 * | 10/2015 | Gelissen ................. C08K 3/22 |
| 9,637,651 | B2 * | 5/2017 | Matoda ................ C09D 11/037 |
| 2001/0048797 | A1 | 12/2001 | Van Dijk et al. |
| 2002/0122931 | A1 | 9/2002 | Brownfield et al. |
| 2003/0108723 | A1 | 6/2003 | Sakoshke et al. |
| 2005/0252417 | A1 | 11/2005 | Carsten et al. |
| 2006/0090868 | A1 | 5/2006 | Brownfield et al. |
| 2006/0155007 | A1 * | 7/2006 | Huber .................. C09D 11/037 |
| | | | 523/205 |

(Continued)

FOREIGN PATENT DOCUMENTS

| CN | 1696213 A | 11/2005 |
| CN | 1730568 A | 2/2006 |
| DE | 19951871 A1 | 5/2001 |

(Continued)

OTHER PUBLICATIONS

English translation of the Written Opinion of the International Search Authority dated Dec. 16, 2014 for PCT/EP2014/002495; 5 pages.*

(Continued)

*Primary Examiner* — Helene Klemanski
(74) *Attorney, Agent, or Firm* — Millen White Zelano and Branigan, PC; Csaba Henter

(57) ABSTRACT

The present invention relates to pigments based on bismuth compounds and to the use thereof, preferably as laser-absorbing additive, and to a process for the preparation thereof.

16 Claims, No Drawings

(56) References Cited

U.S. PATENT DOCUMENTS

2007/0029294 A1    2/2007  Peng et al.
2008/0092778 A1*   4/2008  Bauer ................. C09D 11/037
                                                    106/419

FOREIGN PATENT DOCUMENTS

| EP | 0753545 A    | 1/1997  |
|----|--------------|---------|
| EP | 0894896 A    | 2/1999  |
| EP | 0959109 A    | 11/1999 |
| EP | 1 190 988 B2 | 9/2008  |
| RU | 2049731 C1   | 12/1995 |
| SU | 436844 A1    | 7/1974  |
| SU | 1730110 A1   | 4/1992  |
| WO | 9812266 A1   | 3/1998  |
| WO | 9835096 A1   | 8/1998  |
| WO | 9920695 A1   | 4/1999  |
| WO | 0168776 A1   | 9/2001  |
| WO | 2006065611 A1| 6/2006  |
| WO | 2011050934 A2| 5/2011  |
| WO | 2011083100 A2| 7/2011  |

OTHER PUBLICATIONS

English Abstract for WO9812266, Publication Date: Mar. 26, 1998.
English Abstract for EP0753545, Publication Date: Jan. 15, 1997.
Office Action for related Chinese Patent Application No. 201480055843 dated Feb. 13, 2017.
International Search Report for PCT/EP2014/002495 dated Dec. 16, 2014.
Office Action in corresponding Rusian Patent Application No. 2016-118023 dated May 29, 2018.
Office Action in corresponding JP Patent Application No. 2016-522057 dated May 15, 2018.

* cited by examiner

PIGMENTS BASED ON BISMUTH COMPOUNDS

The present invention relates to pigments based on bismuth compounds and to the use thereof, preferably as laser-absorbing additive, and to a process for the preparation thereof.

The identification marking of products is becoming increasingly important in virtually all branches of industry. For example, it is frequently necessary to apply production dates, expiry dates, bar codes, company logos, serial numbers, etc., to plastic parts or flexible plastic films. These inscriptions are currently usually carried out using conventional techniques, such as printing, hot embossing, other embossing methods or labelling. In particular in the case of plastics, however, increasing importance is being attached to a contactless, very rapid and flexible inscription method using lasers. With this technique, it is possible to apply graphic prints, such as, for example, bar codes, at high speed, even to non-planar surfaces. Since the inscription is located within the plastic article itself, it is durably abrasion-resistant.

It is generally known that, on irradiation with laser light, certain materials, such as polymers, for example plastics and resins, can absorb energy from the laser light and convert this energy into heat, where a colour-changing reaction (=inscription) can be induced in the material. Laser-light absorbers are used to improve the absorption of laser light if the intrinsic ability of a polymer with respect to the absorption of laser light is inadequate.

Many plastics, for example polyolefins and polystyrenes, have hitherto been difficult or even impossible to inscribe using a laser. A $CO_2$ laser which emits infrared light in the region of 10.6 μm only gives rise to a very weak, virtually illegible inscription on polyolefins or polystyrenes, even on use of high power. In the case of polyurethane elastomers and polyetherester elastomers, there is no interaction with Nd-YAG lasers, but embossing occurs on use of $CO_2$ lasers. A plastic must not reflect or transmit any laser light, since then no interaction occurs. Nor must excessively strong absorption take place, however, since in this case the plastic evaporates, leaving only an embossing. The absorption of laser beams, and therefore the interaction with the material, depends on the chemical structure of the composition and on the laser wavelength used. It is frequently necessary to add suitable additives, such as absorbers, in order to render plastics laser-inscribable.

The successful absorber should have a very pale inherent colour and/or only have to be employed in very small amounts. The prior art discloses that the contrast agent antimony trioxide satisfies such criteria. However, antimony trioxide is toxic and suspected of being carcinogenic, and antimony-free laser inscription additives are therefore desired.

Antimony-free laser inscription additives are known from the literature, as described, for example, in the patent applications WO 2011/083100, WO 2011/050934 and WO 2006/065611. EP 1 190 988 B1 discloses laser-inscribable compounds which contain bismuth and at least one additional metal. US 2007/029294 is directed to the laser inscription of polymers comprising compounds of the formula MOCl, where M is either As, Sb or Bi, and comprising $BiONO_3$, $Bi_2O_2CO_3$, $BiOOH$, $BiOF$, $BiOBr$, $Bi_2O_3$ or $BiOC_3H_5O_7$.

WO 2011/050934 describes, for example, the stabilisation of $Bi_2O_3$ by extrusion of $Bi_2O_3$ and a functionalised polymer, so that the $Bi_2O_3$-containing additive can subsequently be incorporated into polymers ("matrix") having a melting point higher than 220° C., for example into polyester, polyamide or polycarbonate. The disadvantage of this method is that the bismuth additive prepared cannot be used universally for any polymer matrix, i.e. there is non-miscibility of various polymers, for example with polyethylene and polyamide.

The disadvantage of bismuth-based laser inscription additives is that they are not suitable for all types of plastics. In certain matrix polymers, the bismuth compounds exhibit strong discoloration if high processing temperatures, i.e. >220° C., are employed. In these cases, $Bi_2O_3$ cannot be used as colour former for the laser inscription of matrix polymers, for example of polyamide, since an exothermic reaction (decomposition) takes place during processing, resulting in extreme discoloration of the product. The product becomes dark and a mark is no longer visible.

The object of the present invention is therefore to provide a pigment based on one or more bismuth compounds in a form which can be incorporated universally as additive, preferably as laser additive, directly into any polymer without decomposition reactions taking place with the polymer matrix. The pigment should preferably be colourless in order to be suitable for universal use as laser additive.

Surprisingly, it has now been found that pigments based on one or more bismuth compounds which are coated with $SiO_2$ in the presence of a chlorine-containing compound and subsequently calcined do not exhibit decomposition reactions on incorporation into plastics and furthermore no difficulties are observed during processing, such as, for example, non-miscibility. This is favoured by the formation of $Bi_xX_yO_z$ and $Bi_aSi_bO_c$ phases during the calcination, such as, for example, $Bi_4Cl_2O_5$, $Bi_{12}Cl_6O_{15}$, $Bi_{24}Cl_{10}O_{31}$, $Bi_2SiO_5$, $Bi_4(SiO_4)_3$ and/or $Bi_{12}SiO_{20}$ phases.

The invention thus relates to pigments of the formula I

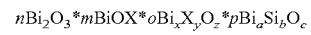

$$n\mathrm{Bi}_2\mathrm{O}_3 * m\mathrm{BiOX} * o\mathrm{Bi}_x\mathrm{X}_y\mathrm{O}_z * p\mathrm{Bi}_a\mathrm{Si}_b\mathrm{O}_c \qquad \mathrm{I}$$

where
  X denotes halogen, preferably Cl
  x denotes 2-30, preferably 2-25
  y denotes 1-15, where, in the case where y=1, z is then >1,
  z denotes 1-35
  a denotes 0-15
  b denotes 1-5
  c denotes 1-25, preferably 1-20 and
  n denotes 0-5
  m denotes 0-5
  o denotes 1-5
  p denotes 1-5.

The present invention likewise relates to a process for the preparation of the pigments according to the invention and to the use of the pigments as additive, inter alia in paints, coatings, plastics, printing inks and in cosmetic formulations.

Suitable base substrates per se are all uncoated bismuth compounds known to the person skilled in the art, such as, for example, $Bi_2O_3$, $BiOCl$, $Bi(NO_3)_3$, $BiONO_3$, $Bi_2O_2CO_3$, $BiOOH$, $BiOF$, $BiOBr$, $BiOC_3H_5O_7$, $Bi(C_7H_5O_2)_3$, $BiPO_4$, $Bi_2(SO_4)_3$, $Bi_aM_bO_c$ (where M=Zn, Ti, Fe, Cu, Al, Zr, P, Sn, Sr, Si, Y, Nb, La, Ta, Pr, Ca, Mg, Mo, W, Sb, Cr, Ba, Ce and a=0.3-70, b=0.05-8 and c=1-100). Particularly preferred base substrates are $Bi_2O_3$, furthermore $BiOCl$, $BiOOH$, $BiOF$ and $BiOBr$. The substrate is very particularly preferably $Bi_2O_3$.

The size of the base substrate is not crucial per se and can be matched to the particular application. In general, the bismuth compounds are in the form of particles and have a particle size of 0.001-100 µm, preferably 0.005-50 µm, and in particular 0.01-10 µm.

All bismuth compounds known to the person skilled in the art can be employed, irrespective of the particle shape. The shape of the substrates is not crucial and can be, for example, spherical, oval, rod-shaped, flake-form or amorphous.

$Bi_2O_3$ is commercially available, for example from 5N Plus Lübeck GmbH, Germany (previously MCP-HEK GmbH), from Poch S. A., Poland or from Merck Millipore GmbH, Germany.

The base substrate is coated with $SiO_2$ in the presence of one or more chlorine compounds, where the coating can be carried out using all methods known to the person skilled in the art. The coating of the base substrates with $SiO_2$ is preferably carried out by wet-chemical methods, where the wet-chemical coating methods developed for the preparation of pearlescent pigments can be used. Furthermore, the $SiO_2$ coating can also be carried out by gas-phase coating in a fluidised-bed reactor, where, for example, the methods proposed in EP 0 045 851 and EP 0 106 235 for the preparation of pearlescent pigments can be used correspondingly.

The chlorine compound is preferably HCl, which is employed as pH regulator during the coating with $SiO_2$. However, the chlorine compounds used can also be, for example, NaCl, KCl, $CaCl_2$, $MgCl_2$. The concentration of the chlorine compound(s) in the case of wet-chemical coating or in the fluidised bed is preferably 0.1-200%, in particular 5-150%, based on the substrate employed. In the case of wet coating, the base substrate (bismuth compound) is suspended in water and one or more hydrolysable metal salts or a water-glass solution are added at a pH which is suitable for the hydrolysis, which is selected so that the $SiO_2$ or the corresponding hydrate is precipitated directly onto the substrate without secondary precipitations occurring. The pH is usually kept constant by simultaneous metered addition of a base and/or acid. The coated substrates are subsequently separated off, washed and dried at 50-150° C., in general for 6-18 h, and calcined at 300 to 815° C., preferably at 500 to 800° C., in general for 15 min-2 h.

The precipitation of the $SiO_2$ layer onto the substrate is preferably carried out by addition of a potassium or sodium water-glass solution at a suitable pH in the presence of a chlorine compound, such as, for example, hydrochloric acid, in order to adjust the pH.

The proportion of $SiO_2$, based on the substrate, is preferably 0.1-200%, in particular 5-100% and very particularly preferably 10-50%. Depending on the shape and size of the substrate employed, the $SiO_2$ layer preferably has layer thicknesses of 1-500 nm, particularly preferably 1-300 nm.

The pigments according to the invention can optionally also be provided with one or more additional layers for achieving, for example, colouristic effects.

The crucial factor for stabilisation of the bismuth compounds is the calcination process after the coating with $SiO_2$. The calcination temperature is preferably ≥300° C. The final pigment has one or more mixed phases after the calcination process.

Particularly preferred pigments according to the invention comprise one or more compounds selected from the group of the following bismuth compounds:

$Bi_4Cl_2O_5$
$Bi_{12}Cl_6O_{15}$
$Bi_{24}Cl_{10}O_{31}$
$Bi_2SiO_5$
$Bi_4(SiO_4)_3$
$Bi_{12}SiO_{20}$

Very particularly preferred pigments comprise the following mixed phases:

$Bi_{24}Cl_{10}O_{31}+Bi_2SiO_5+Bi_4(SiO_4)_3$ or
$Bi_{24}Cl_{10}O_{31}+BiOCl$ or
$Bi_{24}Cl_{10}O_{31}+BiOCl+Bi_4O_5Cl_2$ or
$Bi_{12}Cl_6O_{15}+BiOCl+Bi_2O_3$ or
$Bi_{24}Cl_{10}O_{31}+Bi_4Cl_2O_5$
$Bi_{12}SiO_{20}+Bi_2SiO_5+Bi_4(SiO_4)_3$
$Bi_{24}Cl_{10}O_{31}+Bi_2SiO_5$

The pigments according to the invention are in the form of particles and preferably have particle sizes of 0.01-100.5 µm, preferably 0.02-50 µm and in particular 0.01-10 µm.

The pigments according to the invention are in the form of particles and can be employed in all known application media in a mixture with all known effect pigments, conventional absorption pigments and/or functional pigments and, depending on the composition of the mixture, give rise to unusual colour and application effects, for example in the laser inscription of plastic parts.

The pigments according to the invention can be used in paints, for example automotive and industrial paints, both solvent- and also water-based, and powder coatings, in plastics, printing inks, ceramic glazes or cosmetic formulations. They can also be utilised in the form of preparations (pearlets, pastes), for example for use in printing inks or plastics.

Particular preference is given to the use in plastics of the pigments according to the invention having a melting point which is at least as high as that of the plastic used, preferably >220° C.

The present invention therefore also relates to a laser-inscribable composition which comprises a matrix polymer and the pigment according to the invention. The pigment is preferably employed in concentrations of 0.05-5% by weight, in particular 0.1-2% by weight and very particularly preferably 0.2-1% by weight, based on the matrix polymer to be inscribed.

All known matrix polymers, such as, for example, plastics, binders, resins, etc., can be employed for the laser-inscription and laser-welding application. Suitable plastics are thermoplastics and thermosets, such as, for example, polyethylene (PE), polypropylene (PP), polyamide (PA), polyester, polyether, polyphenylene ether, polyacrylate, polyurethane (PU), polyoxymethylene (POM), polymethacrylate, polymethyl methacrylate (PMMA), polyvinyl acetate (PVAC), polystyrene (PS), acrylonitrile-butadiene-styrene (ABS), acrylonitrile-styrene-acrylate (ASA), ABS graft polymer, polybutylene terephthalate (PBT), polyethylene terephthalate (PET), polyvinyl chloride (PVC), polyvinylidene chloride (PVDC), polyvinylidene fluoride (PVDF), polytetrafluoroethylene (PTFE), polycarbonate (PC), polyether sulfones, polyether ketone, thermoplastic polyurethane (TPU), thermoplastic elastomers (TPE), epoxy resin (EP), silicone resin (SI), unsaturated polyester resin (UP), phenol-formaldehyde resin (PF), urea-formaldehyde resin (UF), melamine resin (MF) and copolymers thereof and/or mixtures thereof. The polymer may also be a copolymer or block copolymer, etc. Conventional and suitable additives may be present.

The plastic is inscribed or welded as follows by means of suitable laser irradiation.

In the laser-inscription method, the sample is placed in the ray path of a pulsed laser beam, preferably an Nd:YAG laser. The inscription can also be carried out using a $CO_2$ laser, for example using a mask technique. The desired results can also be achieved using other conventional types of laser whose wavelength is within the region of high absorption of the micro-spheres used. The inscription obtained is determined by the irradiation duration (or number of pulses in the case of a pulsed laser) and by the power emitted by the laser and also by the polymer system used. The power of the laser used depends on the specific application and can readily be determined by a person skilled in the art in a specific case.

In the case of laser inscription, the laser used generally has a wavelength in a range from 157 nm to 10.6 µm, preferably in a range from 532 nm to 10.6 µm. Examples which may be mentioned are a $CO_2$ laser (10.6 µm) and an Nd:YAG laser (1064 nm, 532 nm or 355 nm), as well as a pulsed UV laser. Excimer lasers have the following wavelengths: $F_2$ excimer laser: 157 nm, ArF excimer laser: 193 nm, KrCl excimer laser: 222 nm, KrF excimer laser: 248 nm, XeCl excimer laser: 308 nm, XeF excimer laser: 351 nm, and frequency-multiplied Nd:YAG laser: wavelength of 355 nm (frequency-tripled) or 265 nm (frequency-quadrupled). Particular preference is given to the use of Nd:YAG lasers (1064 or 532 nm) and $CO_2$ lasers. The energy densities of the lasers used are generally within a range from 0.3 mJ/cm² to 50 J/cm², preferably from 0.3 mJ/cm² to 10 J/cm².

If pulsed lasers are used, the pulse frequency is generally within a range from 1 to 150 kHz. Corresponding lasers which can be used in the process according to the invention are commercially available.

The inscription using the laser is preferably carried out by introducing the article into the ray path of a $CO_2$ laser (10.6 µm) or a pulsed laser, preferably an Nd:YAG laser.

The pigments according to the invention can be used in any desired area in which conventional printing processes have hitherto been used for the inscription or marking of matrix polymers. Virtually any plastic article can be obtained in laser-markable or laser-inscribable form. Any type of article which consists of a matrix polymer, such as a plastic, can be provided with function data, bar codes, logos, graphics, pictures and identification codes. In addition, they can be used, for example, in medical equipment, such as tubes, containers for tissue samples or fluids, syringes, pots, covers, catheters, in the automobile sector, for example for fluid containers, cabling, components, in the telecommunications and E&E sectors, for example for GSM front parts, keyboards, microswitches, in security and identification applications, such as, for example, credit cards, identification cards, animal identification tags, labels, security strips, in marketing applications, such as, for example, logos, decoration on corks, golf balls, promotional articles, in packaging, such as, for example, single- and multilayered films, bottles, caps and closures, including screw caps for bottles, security closures and synthetic corks.

For example, moulds made from plastics which comprise the pigment according to the invention can be used in the electrical industry, electronics industry or motor vehicle industry. With the aid of laser light, it is possible to produce identification markings or inscription markings even at points to which access is difficult, for example on cables, lines, decorative strips or functional parts in the heating, ventilation or cooling sector or on switches, plugs, levers or handles. The polymer system according to the invention comprising pigments of the formula I can also be used for packaging in the food and drinks sector or in the toys sector. The inscriptions on the packaging are wipe- and scratch-resistant, resistant during downstream sterilisation processes, and can be employed in a hygienically clean manner during the inscription process. Complete label motifs can be applied in a durable manner to packaging of reusable systems. A further important application sector for laser inscription is the inscription of plastics for the production of individual identification markings for animals, which are known as cattle ear tags or simply ear tags. The information specifically associated with the animal is stored via a bar code system. It can be called up again when required with the aid of a scanner. The inscription must be extremely resistant, since some tags remain on the animals for many years.

Laser welding with the pigment according to the invention can be carried out in all areas in which conventional joining methods have been employed and in which it was hitherto not possible to employ the welding process owing to laser-transparent polymers or pale colours. The welding process for laser-transparent plastics thus represents an alternative to conventional joining methods, for example high-frequency welding, vibration welding, ultrasound welding, hot-air welding or also adhesive bonding of plastic parts.

The following examples are intended to explain the invention without restricting it. The percentages relate to the weight, unless indicated otherwise.

EXAMPLES

Example 1: 50% of $SiO_2$, Based on the Substrate; Calcination Temperature: 700° C.

100 g of $Bi_2O_3$ (bismuth oxide, varistor grade fine; average particle size: 2 µm, 5N Plus Lübeck GmbH) are heated to 75° C. in 2 l of demineralised water with stirring. The pH of the suspension is then adjusted to 7.5 using 10% hydrochloric acid. This is followed by metered addition of a sodium water-glass solution (182 g of sodium water-glass solution, comprising 27.5% of $SiO_2$, are dissolved in 182 g of deionised water), where the pH is kept constant by simultaneous dropwise addition of 10% hydrochloric acid. When the addition is complete, the mixture is stirred for a further 0.5 h.

The product is filtered, washed, dried at 120° C. for 12 h, calcined at 700° C. for 0.5 h, sieved through a 100 µm sieve and investigated with the aid of XRD.

The slightly yellowish material obtained in this way is incorporated into polyamide in a concentration of 0.2% by means of an extruder. This compound is then moulded in an injection-moulding machine to give test plates. A test grid by means of which a wide band width of various laser settings with respect to energy of the laser, speed of the laser beam and frequency of the laser pulses can be represented is marked onto these plates using an Nd:YAG laser (Trumpf: writing speed: 500-5000 mm/s, pulse frequency: 20-100 kHz). The additive from Example 1 exhibits a uniform black marking with excellent contrast over virtually the entire spectrum of different laser parameters.

Comparative Example 1: Incorporation of $Bi_2O_3$ into Polyamide $Bi_2O_3$ (bismuth oxide, varistor grade fine; average particle size: 2 µm, 5N Plus Lübeck GmbH) is incorporated into polyamide in a concentration of 1% by means of an extruder. Decomposition reactions occur even during processing in the extruder, and a dark to black-coloured product forms.

The "compound" is then moulded in an injection-moulding machine to give dark-brown to black test plates. A test grid is marked onto these plates using an Nd:YAG laser (Trumpf: writing speed: 500-5000 mm/s, pulse frequency:

20-100 kHz). The contrast of the dark inscription on a dark background is virtually invisible to the eye.

Example 2: 6.25% of $SiO_2$, Based on the Substrate; Calcination Temperature: 700° C.

100 g of $Bi_2O_3$ (bismuth oxide, varistor grade fine; average particle size: 2 μm, 5N Plus Lübeck GmbH) are heated to 75° C. in 2 l of demineralised water with stirring. The pH of the suspension is then adjusted to 7.5 using 10% hydrochloric acid. This is followed by metered addition of a sodium water-glass solution (23 g of sodium water-glass solution, comprising 27.5% of $SiO_2$, are dissolved in 46 g of deionised water), where the pH is kept constant by simultaneous dropwise addition of 10% hydrochloric acid. When the addition is complete, the mixture is stirred for a further 0.5 h.

The product is filtered, washed, dried at 140° C. for 12 h, calcined at 700° C. for 1 h, sieved through a 100 μm sieve and investigated with the aid of XRD.

Example 3: 100% of $SiO_2$, Based on the Substrate; Calcination Temperature: 500° C.

100 g of $Bi_2O_3$ (bismuth oxide, varistor grade fine; average particle size: 2 μm, 5N Plus Lübeck GmbH) are heated to 75° C. in 2 l of demineralised water with stirring. The pH of the suspension is then adjusted to 7.5 using 10% hydrochloric acid. This is followed by metered addition of a sodium water-glass solution (364 g of sodium water-glass solution, comprising 27.5% of $SiO_2$, are dissolved in 364 g of deionised water), where the pH is kept constant by simultaneous dropwise addition of 10% hydrochloric acid. When the addition is complete, the mixture is stirred for a further 0.5 h.

The product is filtered, washed, dried at 120° C. ° C. for 12 h, calcined at 500° C. for 2 h, sieved through a 100 μm sieve and investigated with the aid of XRD.

Example 4: 12.5% of $SiO_2$, Based on the Substrate; Calcination Temperature: 700° C.

100 g of $Bi_2O_3$ (bismuth oxide, varistor grade fine; average particle size: 2 μm, 5N Plus Lübeck GmbH) are heated to 75° C. in 2 l of demineralised water with stirring. The pH of the suspension is then adjusted to 7.5 using 10% hydrochloric acid. This is followed by metered addition of a sodium water-glass solution (46 g of sodium water-glass solution, comprising 27.5% of $SiO_2$, are dissolved in 46 g of deionised water), where the pH is kept constant by simultaneous dropwise addition of 10% hydrochloric acid. When the addition is complete, the mixture is stirred for a further 0.5 h.

The product is filtered, washed, dried at 110° C. for 12 h, calcined at 700° C. for 0.5 h, sieved through a 100 μm sieve and investigated with the aid of XRD.

Example 5: 25% of $SiO_2$, Based on the Substrate; Calcination Temperature: 500° C.

100 g of $Bi_2O_3$ (bismuth oxide, varistor grade fine; average particle size: 2 μm, 5N Plus Lübeck GmbH) are heated to 75° C. in 2 l of demineralised water with stirring. The pH of the suspension is then adjusted to 7.5 using 10% hydrochloric acid. This is followed by metered addition of a sodium water-glass solution (91 g of sodium water-glass solution, comprising 27.5% of $SiO_2$, are dissolved in 91 g of deionised water), where the pH is kept constant by simultaneous dropwise addition of 10% hydrochloric acid. When the addition is complete, the mixture is stirred for a further 0.5 h.

The product is filtered, washed, dried at 130° C. for 15 h, calcined at 500° C. for 0.5 h, sieved through a 100 μm sieve and investigated with the aid of XRD.

Example 6: 100% of $SiO_2$, Based on the Substrate; Calcination Temperature: 300° C.

100 g of $Bi_2O_3$ (bismuth oxide, varistor grade fine; average particle size: 2 μm, 5N Plus Lübeck GmbH) are heated to 75° C. in 2 l of demineralised water with stirring. The pH of the suspension is then adjusted to 7.5 using 10% hydrochloric acid. This is followed by metered addition of a sodium water-glass solution (364 g of sodium water-glass solution, comprising 27.5% of $SiO_2$, are dissolved in 364 g of deionised water), where the pH is kept constant by simultaneous dropwise addition of 10% hydrochloric acid. When the addition is complete, the mixture is stirred for a further 0.5 h.

The product is filtered, washed, dried at 120° C. for 12 h, calcined at 300° C. for 1 h, sieved through a 100 μm sieve and investigated with the aid of XRD.

Example 7: 25% of $SiO_2$, Based on $Bi_2O_3$; Calcination Temperature: 300° C.

Preparation of a bismuth-containing additive having the composition $Bi_2O_3/SiO_2$ and incorporation into polyamide 100 g of $Bi_2O_3$ (bismuth oxide, varistor grade fine; average particle size: 2 μm, 5N Plus Lübeck GmbH) are heated to 75° C. in 2 l of demineralised water with stirring. The pH of the suspension is then adjusted to 7.5 using 10% hydrochloric acid. This is followed by metered addition of a sodium water-glass solution (91 g of sodium water-glass solution, comprising 27.5% of $SiO_2$, are dissolved in 91 g of deionised water), where the pH is kept constant by simultaneous dropwise addition of 10% hydrochloric acid. When the addition is complete, the mixture is stirred for a further 0.5 h.

The product is filtered, washed, dried at 110° C. for 15 h, calcined at 300° C. for 1 h, sieved through a 100 μm sieve and investigated with the aid of XRD.

Example 8: 50% of $SiO_2$, Based on the Substrate; Calcination Temperature: 300° C.

100 g of BiOCl (bismuth oxychloride, average particle size: 8-18 μm, Merck KGaA) are heated to 75° C. in 2 l of demineralised water with stirring. The pH of the suspension is then adjusted to 7.5 using 10% sodium hydroxide solution. This is followed by metered addition of a sodium water-glass solution (182 g of sodium water-glass solution, comprising 27.5% of $SiO_2$, are dissolved in 182 g of deionised water), where the pH is kept constant by simultaneous dropwise addition of 10% hydrochloric acid. When the addition is complete, the mixture is stirred for a further 0.5 h.

The product is filtered, washed, dried at 110° C. for 12 h, calcined at 300° C. for 0.5 h, sieved through a 100 μm sieve and investigated with the aid of XRD.

The compounds prepared in accordance with Examples 1-8 exhibit the following phases according to XRD (Stoe):

TABLE

| Example | Calcination temperature (° C.) | SiO$_2$ (% based on substrate before the calcination process | Substrate:SiO$_2$ before the calcination process | Finding |
|---|---|---|---|---|
| 1 | 700 | 50 | 67:33 | Bi$_{24}$Cl$_{10}$O$_{31}$ + Bi$_2$SiO$_5$ + Bi$_4$(SiO$_4$)$_3$ |
| 2 | 700 | 6.25 | 94:6 | BiOCl + Bi$_{24}$Cl$_{10}$O$_{31}$ + Bi$_{12}$SiO$_{20}$ |
| 3 | 500 | 100 | 50:50 | Bi$_{24}$Cl$_{10}$O$_{31}$ + BiOCl + Bi$_4$(SiO$_4$)$_3$ |
| 4 | 700 | 12.5 | 89:11 | Bi$_{24}$Cl$_{10}$O$_{31}$ + Bi$_{24}$O$_{31}$Cl$_{10}$ + Bi$_{12}$SiO$_{20}$ |
| 5 | 500 | 25 | 80:20 | BiOCl + Bi$_{24}$Cl$_{10}$O$_{31}$ + Bi$_4$O$_5$Cl$_2$ |
| 6 | 300 | 100 | 50:50 | BiOCl + Bi$_{24}$Cl$_{10}$O$_{31}$ + Bi$_4$(SiO$_4$)$_3$ |
| 7 | 300 | 25 | 80:20 | BiOCl + Bi$_2$O$_3$ + Bi$_{12}$Cl$_{15}$O$_6$ |
| 8 | 300 | 50 | 67:33 | Bi$_{24}$Cl$_{10}$O$_{31}$ + BiOCl + Bi$_2$SiO$_5$ |

The invention claimed is:

1. A pigment of formula I $$n\text{Bi}_2\text{O}_3 * m\text{BiOX} * o\text{Bi}_x\text{X}_y\text{O}_z * p\text{Bi}_a\text{Si}_b\text{O}_c \quad \text{I}$$

where
X denotes halogen
x denotes 2-30,
y denotes 1-15, where, in the case y=1, z is then >1,
z denotes 1-35
a denotes 0-15
b denotes 1-5
c denotes 1-25,
n denotes 0-5
m denotes 0-5
o denotes 1-5
p denotes 1-5.

2. The pigment according to claim 1, wherein X denotes chlorine.

3. The pigment according to claim 1, wherein o=1.

4. The pigment according to claim 1, wherein x=2-25.

5. The pigment according to claim 1, wherein c=1-20.

6. The pigment according to claim 1, which comprises one or more of the following compounds Bi$_4$Cl$_2$O$_5$
Bi$_{12}$Cl$_6$O$_{15}$
Bi$_{24}$Cl$_{10}$O$_{31}$
Bi$_2$SiO$_5$
Bi$_4$(SiO$_4$)$_3$
Bi$_{12}$SiO$_{20}$.

7. The pigment according to claim 1, which comprises the following mixed phase:
Bi$_{24}$Cl$_{10}$O$_{31}$+Bi$_2$SiO$_5$+Bi$_4$(SiO$_4$)$_3$ or
Bi$_{24}$Cl$_{10}$O$_{31}$+BiOCl or
Bi$_{24}$Cl$_{10}$O$_{31}$+BiOCl+Bi$_4$O$_5$Cl$_2$ or
Bi$_{12}$Cl$_6$O$_{15}$+BiOCl+Bi$_2$O$_3$ or
Bi$_{24}$Cl$_{10}$O$_{31}$+Bi$_4$Cl$_2$O$_5$ or
Bi$_{12}$SiO$_{20}$+Bi$_2$SiO$_5$+Bi$_4$(SiO$_4$)$_3$ or
Bi$_{24}$Cl$_{10}$O$_{31}$+Bi$_2$SiO$_5$.

8. The pigment according to claim 1, which has particle sizes of 0.01-100.5 μm.

9. A process for preparing the pigment according to claim 1, comprising coating a bismuth compound selected from the group consisting of Bi$_2$O$_3$, BiOCl, BiONO$_3$, Bi(NO$_3$)$_3$, Bi$_2$O$_2$CO$_3$, BiOOH, BiOF, BiOBr, BiOC$_3$H$_5$O$_7$, Bi(C$_7$H$_5$O$_2$)$_3$, BiPO$_4$, Bi$_2$(SO$_4$)$_3$, Bi$_a$M$_b$O$_c$ with SiO$_2$ in the presence of a chlorine compound and subsequently calcining at a temperature of 300-815° C.,
wherein M=Zn, Ti, Fe, Cu, Al, Zr, P, Sn, Sr, Si, Y, Nb, La, Ta, Pr, Ca, Mg, Mo, W, Sb, Cr, Ba or Ce, a=0.3-70, b=0.05-8 and c=1-100.

10. The process according to claim 9, wherein the bismuth compound is Bi$_2$O$_3$.

11. An additive for laser marking, for laser welding, or in a product selected from the group consisting of paints, coatings, powder coatings, printing inks, plastics, preparations, and granules, comprising a pigment according to claim 1.

12. A polymer matrix comprising at least one pigment according to claim 1.

13. The process according to claim 9, wherein the bismuth compound has a shape that is spherical or oval.

14. The process according to claim 9, wherein the bismuth compound has a shape that is amorphous.

15. The process according to claim 9, wherein the SiO$_2$ in the presence of a chlorine compound is coated directly onto the bismuth compound, which is uncoated before the coating with the SiO$_2$ in the presence of a chlorine compound.

16. A method for laser marking a polymer matrix, comprising laser marking a matrix according to claim 12.

* * * * *